(No Model.) 12 Sheets—Sheet 1.

T. H. PHILLIPS.
IMPACT TOOL.

No. 557,084. Patented Mar. 24, 1896.

WITNESSES:
Ernest Hafen
Charles L. Le Cour

INVENTOR
Thomas H. Phillips
BY
Howson & Howson
ATTORNEYS (No Model.)  12 Sheets—Sheet 2.

T. H. PHILLIPS.
IMPACT TOOL.

No. 557,084. Patented Mar. 24, 1896.

WITNESSES:
Ernest Hafer
Charles DeCou

INVENTOR
Thomas H. Phillips
BY
Howson & Howson
ATTORNEYS (No Model.)  
T. H. PHILLIPS.  
IMPACT TOOL.

No. 557,084. Patented Mar. 24, 1896.

WITNESSES:  
Ernest Hafer  
Charles Le Cow

INVENTOR  
Thomas H. Phillips  
BY  
Howson & Howson  
ATTORNEYS

(No Model.) 12 Sheets—Sheet 4.

T. H. PHILLIPS.
IMPACT TOOL.

No. 557,084. Patented Mar. 24, 1896.

WITNESSES:
Ernest Hafen
Charles Le Cou

INVENTOR
Thomas H. Phillips
BY
Howson & Howson
ATTORNEYS (No Model.) 12 Sheets—Sheet 5.

T. H. PHILLIPS.
IMPACT TOOL.

No. 557,084. Patented Mar. 24, 1896.

WITNESSES:
Ernest Hafen
Charles LeCou

INVENTOR
Thomas H. Phillips
BY
Howson & Howson
ATTORNEYS (No Model.) 12 Sheets—Sheet 6.

T. H. PHILLIPS.
IMPACT TOOL.

No. 557,084. Patented Mar. 24, 1896.

WITNESSES:

INVENTOR
Thomas H. Phillips
BY
Howson & Howson
ATTORNEYS (No Model.)  
T. H. PHILLIPS.  
IMPACT TOOL.

No. 557,084.  
Patented Mar. 24, 1896.

WITNESSES:  
INVENTOR  
Thomas H. Phillips  
BY  
ATTORNEYS

(No Model.) 12 Sheets—Sheet 8.

T. H. PHILLIPS.
IMPACT TOOL.

No. 557,084. Patented Mar. 24, 1896.

WITNESSES:
Ernest Hafen
Charles DeCou

INVENTOR
Thomas H. Phillips
BY
Howson & Howson
ATTORNEYS (No Model.) 12 Sheets—Sheet 10.

T. H. PHILLIPS.
IMPACT TOOL.

No. 557,084. Patented Mar. 24, 1896.

WITNESSES:
Ernest Hafen
Charles Le Cow

INVENTOR
Thomas H. Phillips
BY
Howson & Howson
ATTORNEYS (No Model.)

T. H. PHILLIPS.
IMPACT TOOL.

No. 557,084.  Patented Mar. 24, 1896.

WITNESSES:

INVENTOR
Thomas H. Phillips
BY
Howson & Howson
ATTORNEYS (No Model.)  T. H. PHILLIPS.  12 Sheets—Sheet 12.
IMPACT TOOL.

No. 557,084.  Patented Mar. 24, 1896.

WITNESSES:  INVENTOR
Ernest Hafen  Thomas H. Phillips
Charles L. De Cou  BY
  Howson & Howson
  ATTORNEYS

UNITED STATES PATENT OFFICE.

THOMAS H. PHILLIPS, OF ST. DAVIDS, PENNSYLVANIA.

IMPACT-TOOL.

SPECIFICATION forming part of Letters Patent No. 557,084, dated March 24, 1896.

Application filed September 20, 1895. Serial No. 563,095. (No model.)

*To all whom it may concern:*

Be it known that I, THOMAS H. PHILLIPS, a citizen of the United States, and a resident of St. Davids, Delaware county, Pennsylvania, have invented certain Improvements in Impact-Tools, of which the following is a specification.

My invention relates to that class of rock-drills or other impact-tools intended to be operated by steam, compressed air, or other motive fluid under pressure, and having a cylinder with reciprocating piston carrying the drill-rod or other implement.

One object of my invention is to attain, without the use of an inlet-governing valve or valves, the advantages of the tool patented by me on April 9, 1895, as regards the use of the motive fluid expansively, the cutting off of the inflow of motive fluid at an earlier point on the return stroke of the piston than on the forward stroke, and the delay in admitting motive fluid to the cylinder ahead of the piston until some time after it has been cut off from the opposite end of the cylinder and the piston has traveled some distance farther in the stroke.

A further object is to prevent preliminary cushioning in either end of the cylinder by the covering of the exhaust-port on said end by the piston some time before the admission of motive fluid to that end, the latter object being attained by means of a valve-controlled exhaust.

As a result of my present improvements I am enabled to simplify the construction of the tool and materially reduce the length and weight of the cylinder without correspondingly lessening the stroke of the piston.

In the accompanying drawings, Figures 1 to 6, inclusive, are sections of my improved impact-tool, taken on the line $a\,a$, Fig. 9, and showing successive positions of the piston and of the exhaust-controlling valves.

The cylinder of the tool is represented at 1, and is properly bored out to receive the piston which has a central grooved or recessed portion 2 and opposite heads 3 3, the latter being provided with suitable packing-rings 4. The front end of the piston is connected to the rod 5, which passes through the front head 6 of the cylinder and carries the drill or other tool to be operated, said front head containing a stuffing-box and confining in the front end of the cylinder a cushioning device of a character similar to that set forth in my former patent.

The rear head 7 of the cylinder carries a ratchet-wheel 8, which is so controlled by pawls as to be free to turn in but one direction, and which has a stem 9 with inclined grooves 10, said stem projecting into the cylinder and engaging with a nut carried by the piston so as to cause a partial turn of the latter on each stroke.

On the side of the cylinder is a box or chest 11 containing a chamber 12 for receiving the motive fluid, said chamber communicating with the interior of the cylinder through two branch ports 13, although this branching of the admission-port is simply a matter of convenience and is not essential, as the chamber 12 may communicate with the cylinder through a single open port or groove of the full length of the space between the ports 13 or through a single central port of limited area, the purpose of the admission-port being to supply motive fluid to the central groove of the piston, from which it is distributed, as hereinafter set forth. In the box or chest 11 are also formed inlet-controlling ports 14 and 15, these inlet-controlling ports being double-ended, one termination of each port being at an end of the cylinder and the other termination being within the cylinder at a distance more or less remote from said end.

In the present instance the port 14 governs the flow of motive fluid to the rear end of the cylinder and is somewhat longer than the port 15 which governs the flow of motive fluid to the front end of the cylinder, this difference being due to the fact that no more power is required on the rearward stroke than is necessary to carry the piston to the limit of its stroke and not strike the back head, while on the forward stroke the blow is needed to do the work. The motive fluid can be, and is, therefore, cut off earlier in my construction on the return than on the forward stroke, the opening and closing of the inner end of the port 14 being effected by the rear head 3 of the piston, and the opening and closing of the inner end of the port 15 being in like manner effected by the front head of the piston. This arrangement of the ports brings the inner end of the long port 14 closer to the admission-port 13 than the inner end of the short port 15, as shown in Figs. 1 to 6.

On the cylinder is an exhaust-chest 16, which is in communication with the atmosphere through the opening 28 and with the cylinder through ports 17 and 18, the former port communicating with the rear end of the cylinder and the port 18 communicating with the forward end of the cylinder. Within the valve-chest 16 is contained an automatically-operated valve structure comprising a rod 19 having two valves 20 and 21 and two end disks 22 and 23 some little distance beyond the valves 20 and 21, respectively, the valve 20 serving to govern the exhaust through the port 17 and the valve 21 governing the exhaust through the port 18. Each of the end disks 22 and 23 is perforated, so as to permit of the passage of motive fluid through the same into its respective end of the valve-chest, and each end disk has a cushion 24 projecting from it, these cushions serving by contact with the head of the cylinder to limit the longitudinal movement of the valve structure and to prevent shock or jar such as would be occasioned by the violent contact of the disks 22 and 23 themselves with the heads of the cylinder. The valve-chest 16 also communicates with the interior of the cylinder through ports 25 and 26, the port 25 being some little distance in advance of the rear end of the cylinder and the port 26 being close to the forward end of the same, and the valves and end disks of the valve structure are so disposed in relation to these ports 25 and 26 that the port 25 communicates with the space between the valve-disk 20 and end disk 22, while the port 26 communicates with the space between the valve 21 and end disk 23.

It will, of course, be understood that the valves and end disks of the valve structure fit so snugly to the bores of their respective portions of the valve-chest that there can be no leakage of motive fluid around said valves or disks.

Figure 1:
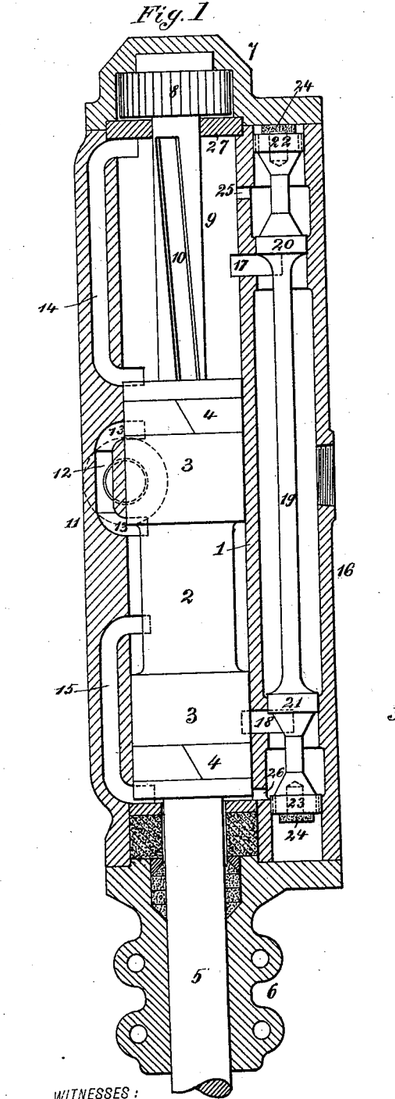
Figure 2:
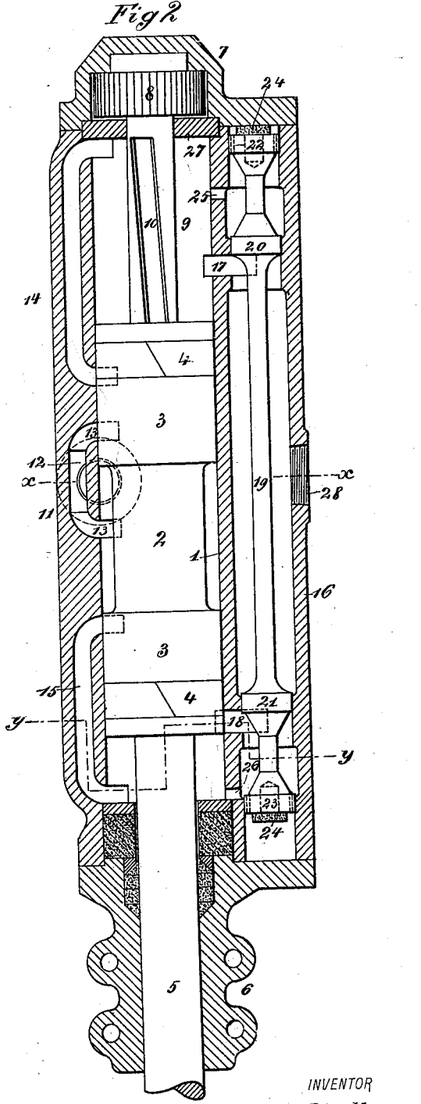
Figure 3:
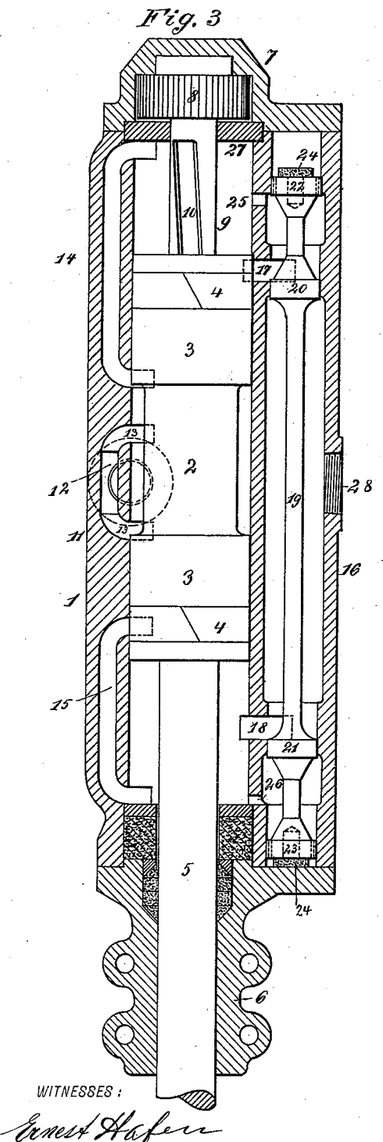
Figure 4:
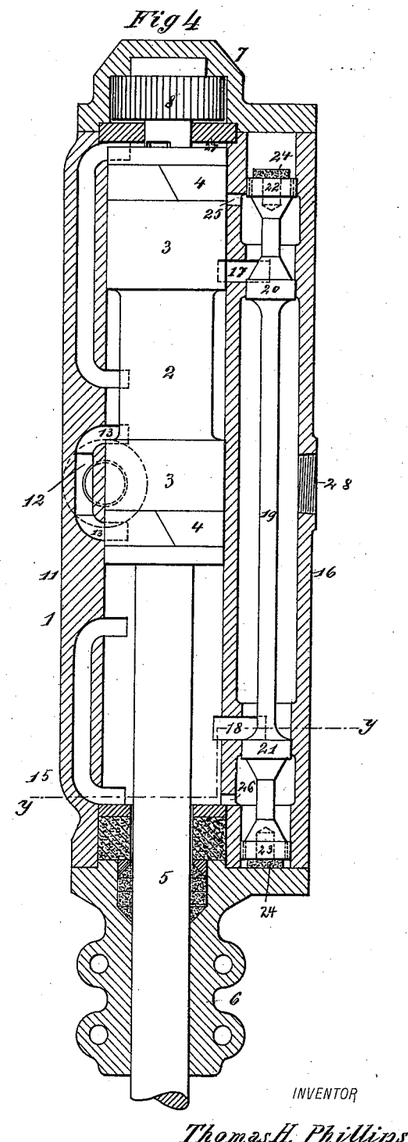
Figure 5:
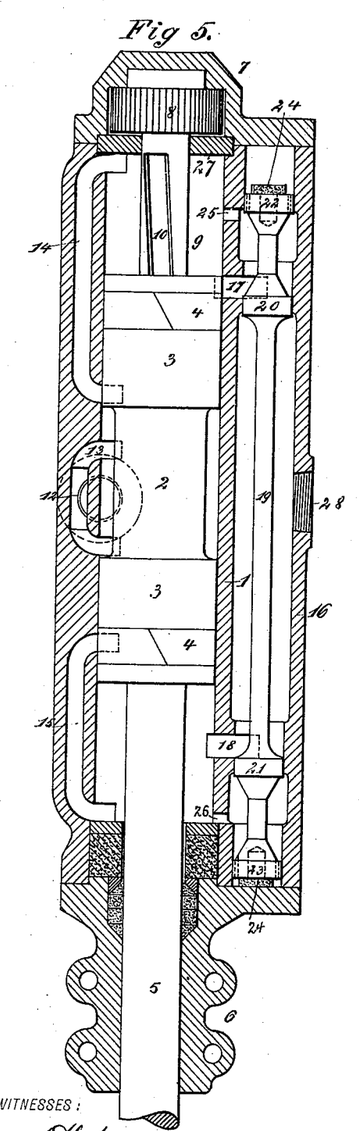
Figure 6:
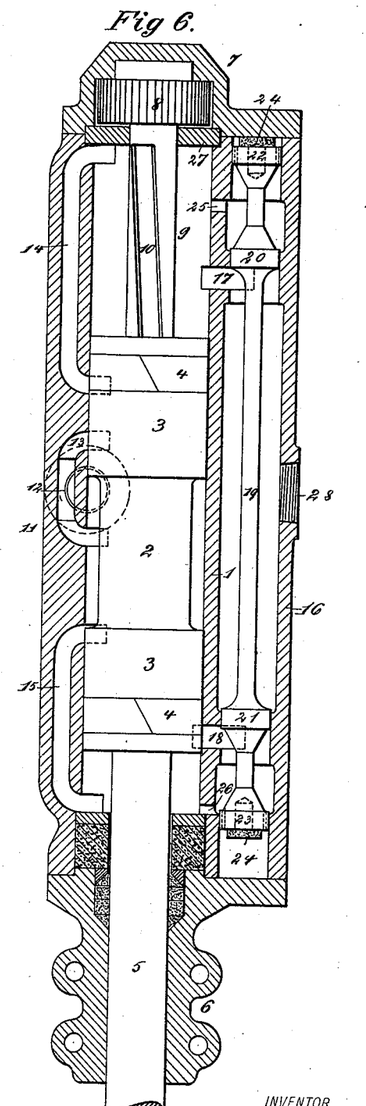
Figure 7:
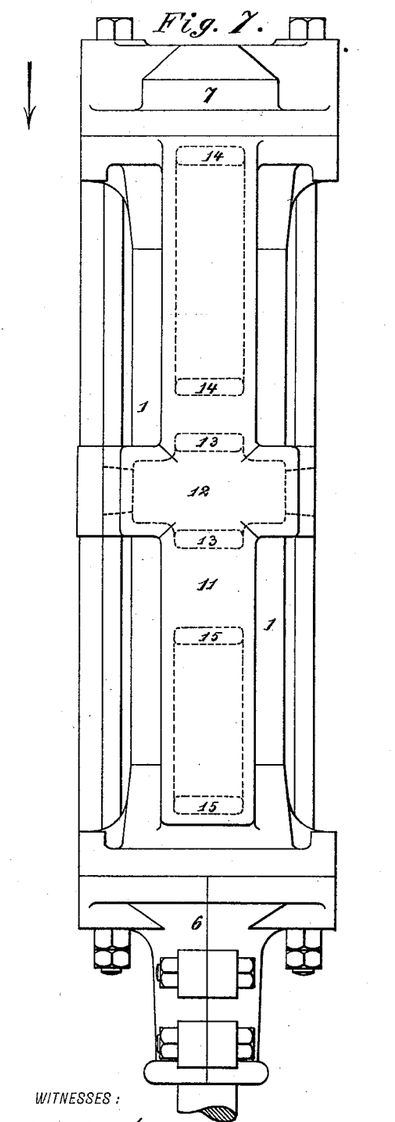
Fig. 7 is a side elevation of the tool.
Figure 8:
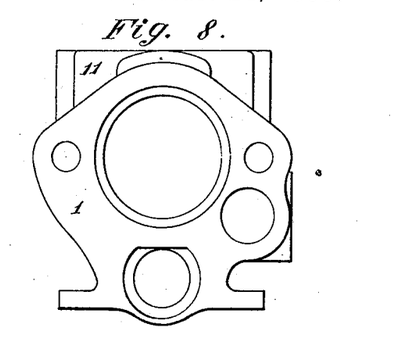
Fig. 8 is an end view of the cylinder, looking in the direction of the arrow, Fig. 7, and with the rear head removed.
Figure 9:
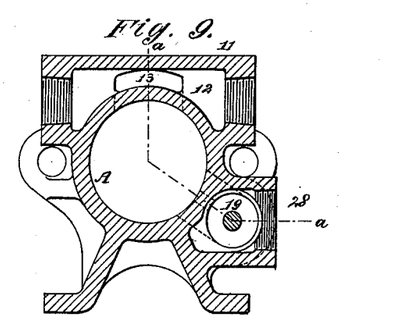
Fig. 9 is a transverse section of the cylinder on the line $x\,x$, Fig. 2, also looking in the direction of the arrow, Fig. 7.
Figure 10:
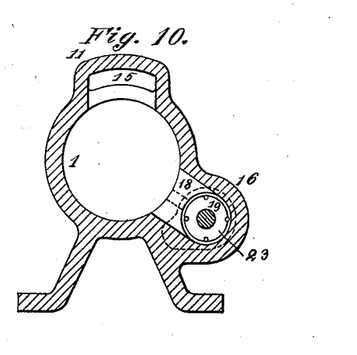
Fig. 10 is a transverse section of the cylinder on the line $y\,y$, Fig. 2, looking in the direction of the arrow, Fig. 7.

The operation of the tool is as follows: When the piston is at the limit of its forward movement, as shown in Fig. 1, the forward end of the cylinder is in communication with the central admission-chamber 12 for the motive fluid through the port 15, the grooved central portion of the piston and the forward port 13. Hence said motive fluid can act to force the piston rearward. The motive fluid has also entered the valve-chest through the port 26 and passing through the perforations in the end disk 23 into the end of the valve-chest has acted upon said disk so as to move the valve structure to the position shown in Fig. 1, the valve 21 cutting off communication between the central discharge-chamber of the valve-chest and the port 18, while the valve 20 is moved rearwardly beyond the port 17, so that the latter and consequently the upper end of the cylinder are in free communication with said discharge-chamber. As the piston is forced rearward the first effect of the movement is to cause the forward head 3 of the piston to close the inner end of the port 15, as shown in Fig. 2, and thus cut off any further flow of motive fluid to the front end of the cylinder. Immediately after this the exhaust-port 18 is uncovered by the forward head of the piston, but there can be no escape of motive fluid through said port, owing to the fact that the valve 21 cuts off communication between the same and the discharge-chamber of the valve-chest. The rearward movement of the plunger therefore continues under the expansive action of the motive fluid until the parts assume the position shown in Fig. 3—that is to say, until the rear head of the piston uncovers the inner end of the port 14 and thus permits the flow of motive fluid to the rear end of the cylinder, the exhaust-port 17 having been closed by the head of the piston just before the opening of the port 14. The motive fluid immediately on its entrance into the rear end of the cylinder passes through the port 25 into the space between the valve 20 and end disk 22 and through the openings in the latter into the rear end of the valve-chamber, and as this motive fluid is under full pressure while the motive fluid acting against the opposite end disk 23 has been reduced in pressure, owing to the expansion of the motive fluid in the forward end of the cylinder, the valve structure will be at once moved to the position shown in Fig. 3, so as to close the communication between the rear exhaust-port 17 and the discharge-chamber of the valve-chest, and open communication between the forward exhaust-port 18 and said discharge-chamber, so as to permit of the escape of motive fluid from the forward end of the cylinder. The momentum of the piston, piston-rod, and tool, however, serves to carry the piston rearward to the position shown in Fig. 4, the motive fluid which has entered the rear end of the cylinder serving as a cushion to prevent contact of the rear head of the piston with the rear cylinder-head or rather with the plate 27, which is inserted between the rear end of the cylinder and said head. The piston now moves forward under the full pressure of the motive fluid until the rear head of the piston closes the inner end of the port 14, as shown in Fig. 5, and thus cuts off the flow of motive fluid to the rear end of the cylinder, the fluid therein contained then acting expansively to continue the forward movement of the piston. The exhaust-port 17 is uncovered by the rear head of the piston immediately after the cutting off of the supply of motive fluid from the rear end of the cylinder; but the valve 20 prevents any escape of motive fluid from the cylinder through the port 17 to the discharge-chamber of the valve-chest until the inner end of the forward port 15 is uncovered by the forward head of the piston, as shown in Fig. 6, and motive fluid is again admitted to the forward end of the cylinder and to the forward end of the valve-chest, so as to effect the restoration of the valve structure from the position shown in Figs. 3, 4, and 5 to that shown in Figs. 1, 2, and 6, the reduction in the pressure of the motive fluid in the rear end of the cylinder and valve-chest permitting such movement as soon as the motive fluid under full pressure is admitted to the front end of the cylinder and valve-chest, the exhaust-port 18 having been closed by the head of the piston just before the opening of the port 15.

Owing to the fact that the forward inlet-governing port 15 is considerably shorter than the rear inlet-governing port 14 and its inner end is closer to the end of the cylinder than that of the port 14, the admission of motive fluid to the forward end of the cylinder is cut off at a point in the back stroke of the piston considerably earlier than the point in the forward stroke at which the motive fluid is cut off from the rear end of the cylinder, and in like manner the admission of motive fluid to the forward end of the cylinder for cushioning purposes and for opening the exhaust from the rear end of the cylinder is at a later point in the forward stroke than the corresponding admission of motive fluid to the rear end of the cylinder and the opening of the forward exhaust on the back stroke. Hence the piston is driven forward with greater force and with much less cushioning effect at the end of the stroke than on the rearward movement, so that the maximum of power is imparted to the blow, while ample cushioning is provided on the rear stroke.

By the use of the exhaust-governing valves 20 and 21 the exhaust-ports 17 and 18 can be located much closer to the ends of the cylinder than would be possible if these valves were not employed. Thus it will be noticed that the exhaust-valves are uncovered by the piston-head immediately after the cutting off of motive fluid from that end of the cylinder with which the exhaust-ports communicate, and if this arrangement were adopted without the use of the exhaust-governing valves there would be no expansive action of the motive fluid at either end of the cylinder, whereas the use of said exhaust-governing valves permits of said expansive action in each end of the cylinder until the motive fluid is admitted to the opposite end.

If the valves 20 and 21 were not employed, the exhaust-ports 17 and 18 would have to be moved inward toward the center of the cylinder to an extent equal to the desired travel of the piston under expansive action, and this, while necessitating an increased length of cylinder, so that these exhaust-ports would not be uncovered by the groove in the piston when said piston was at the extreme limit of either stroke, would also lead to an objectionable preliminary cushioning in each end of the cylinder during that portion of the travel of the piston in either direction after it had covered the exhaust-port and before it had opened the port for the inlet of motive fluid to the end of the cylinder toward which it was traveling, the vapor at atmospheric pressure confined in the cylinder undergoing compression for this distance.

It is not necessary to the proper carrying out of my invention, however, that the ports whose communication with the discharge-chamber of the valve-chest is controlled by the valves 20 and 21 should be the ports from which the motive fluid is exhausted from the cylinder, for the same object in preventing what I term "preliminary cushioning" may be attained even when the exhaust-ports from which the motive fluid escapes from the cylinder are independent of those controlled by the valves. For instance, in Figs. 11 to 19 I have shown a construction in which, in addition to the valve-controlled ports 17 and 18 for preventing preliminary cushioning, there are other exhaust-ports 17$^a$ and 18$^a$ for the main exhaust, located some distance nearer the center of the cylinder than the ports 17 and 18, this distance being governed by the extent of expansion required.

Figure 11:
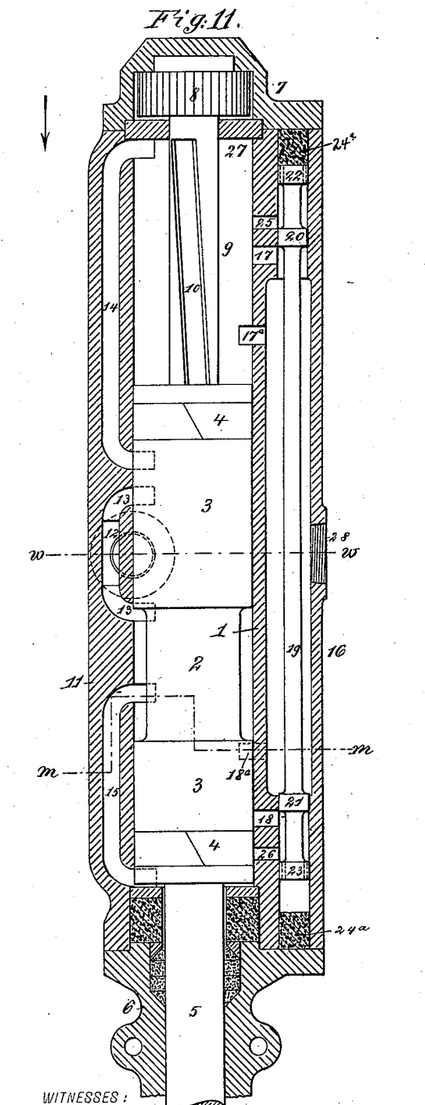
Figs. 11 to 16, inclusive, are longitudinal sections taken on the line $b\,b$, Fig. 18, illustrating in different successive positions the piston and exhaust-controlling valves of a tool in which said exhaust-controlling valves and the ports in conjunction with which they operate are of a somewhat different character from those of the tool shown in Figs. 1 to 10.
Figure 12:
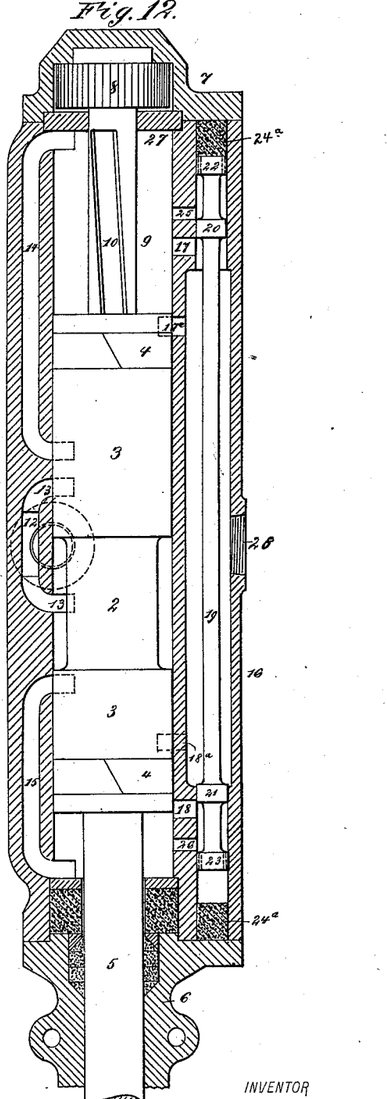
Figure 13:
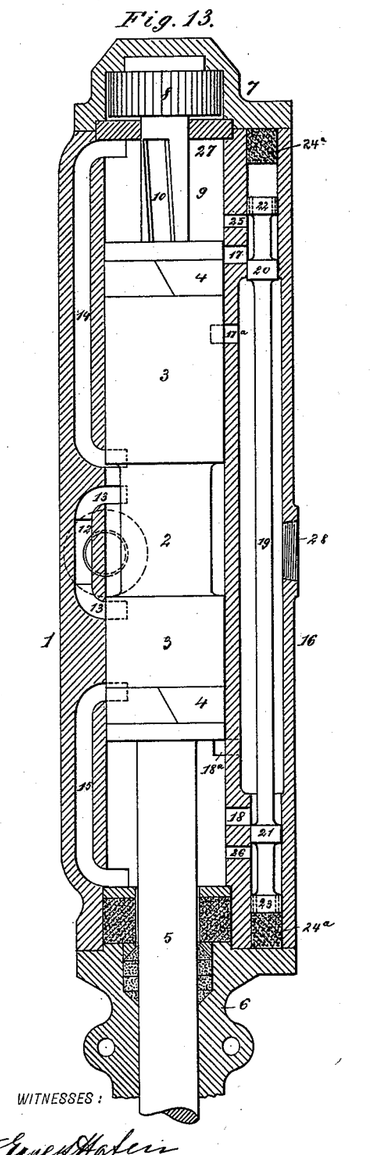
Figure 14:
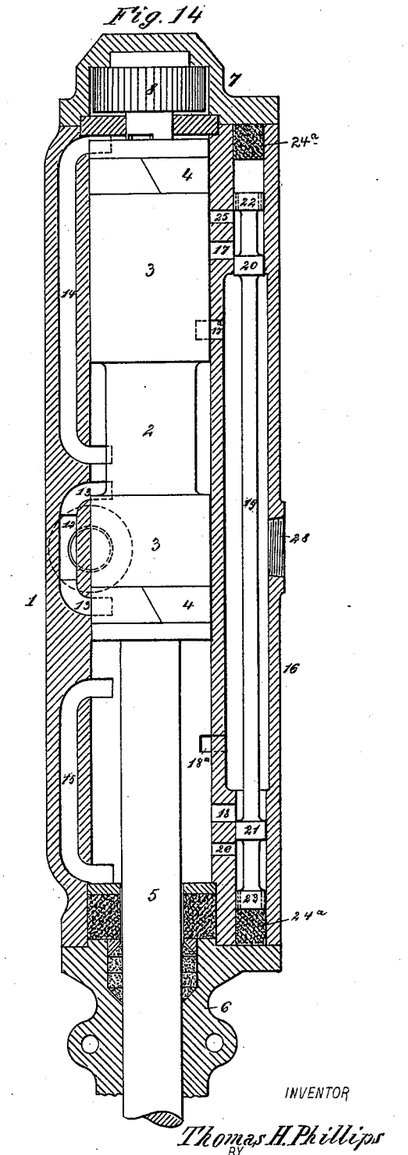
Figure 15:
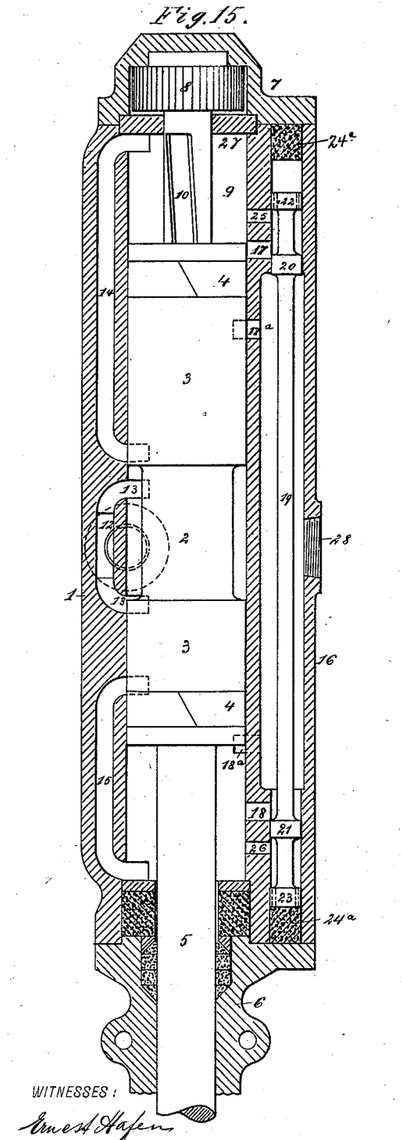
Figure 16:
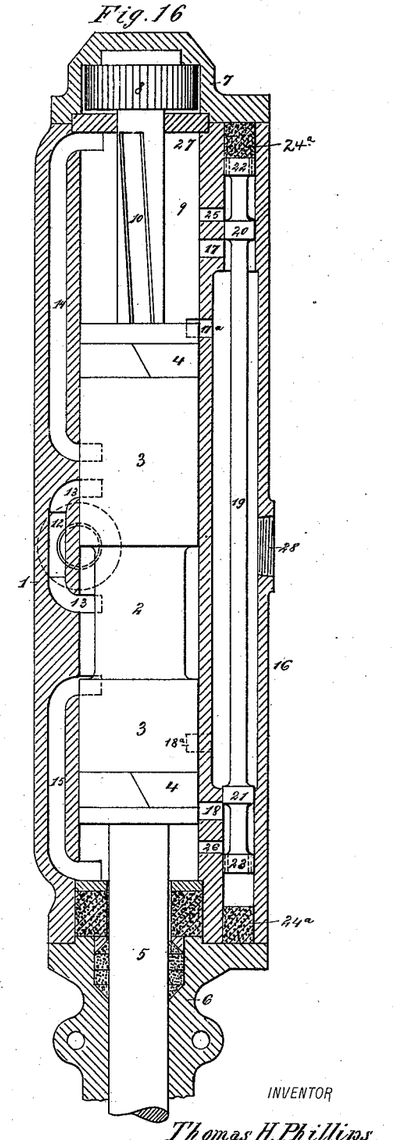
Figure 17:
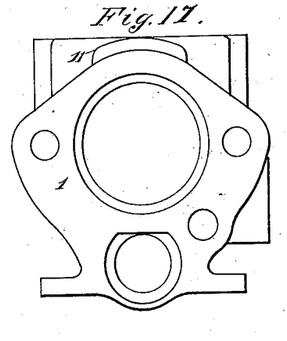
Fig. 17 is an end view of the cylinder of the tool shown in Figs. 11 to 16, looking in the direction of the arrow, Fig. 11, and with the rear head removed.
Figure 18:
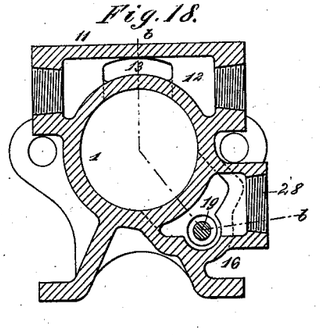
Fig. 18 is a transverse section of the cylinder on the line $w\,w$, Fig. 11, looking in the direction of the arrow.
Figure 19:
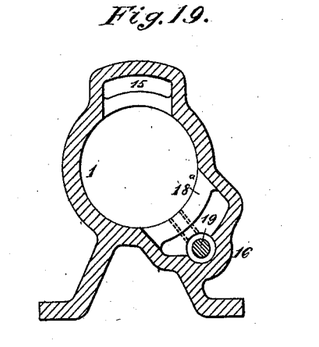
Fig. 19 is a transverse section of the cylinder on the line $m\,m$, Fig. 11, looking in the direction of the arrow.
Figure 20:
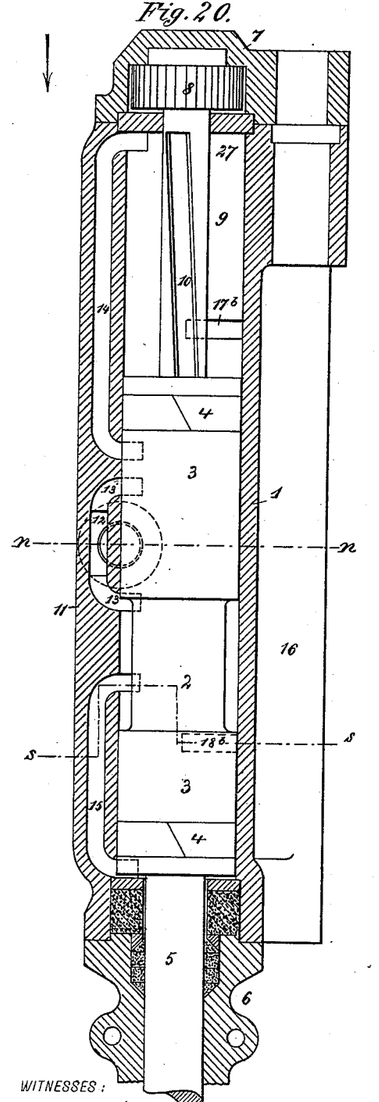
Figs. 20 to 25, inclusive, are longitudinal sections of an impact-tool in which the exhaust-governing valve is omitted, the tool being otherwise constructed, however, in accordance with my invention, and the piston being shown in its different successive positions.

In Fig. 11 the piston is shown at the end of its forward movement and as it moves rearward it closes the port 17$^a$, as shown in Fig. 12, but as the smaller port 17 is open to the discharge-chamber of the valve-chest there is no preliminary compression in the rear end of the cylinder, the fluid therein continuing to escape through said port 17, as shown in Fig. 12, until the rear head of the piston uncovers the inner end of the port 14, as shown in Fig. 13, and permits a flow of motive fluid to the rear end of the cylinder, the port 17 by this time being covered by the rear head of the piston and the forward port 18$^a$ having been uncovered by the forward head of the piston, so as to permit a direct exhaust from the forward end of the cylinder into the discharge-chamber of the valve-chest, and the valve mechanism having been caused to take the position shown in Fig. 13, because of the pressure having been relieved from the disk 23 and full pressure acting upon the disk 22 in the manner previously explained. In like manner on the forward stroke the exhaust-port 18$^a$ will be closed without preliminary compression in advance of the piston, as will be seen on reference to Fig. 15, in which the port is always closed, the fluid in the front end of the cylinder continuing to escape through the port 18 until the latter is closed immediately before the admission of motive fluid to the front end of the cylinder, the opening of the exhaust at the rear end of the same, and the change in the position of the valve structure, as shown in Fig. 16.

In the tool shown in Figs. 11 to 16 the cushions 24$^a$ for the end disks of the valve structure are located in the ends of the valve-chamber instead of being carried by the valve-disks, as in the form of tool first described.

Figure 21:
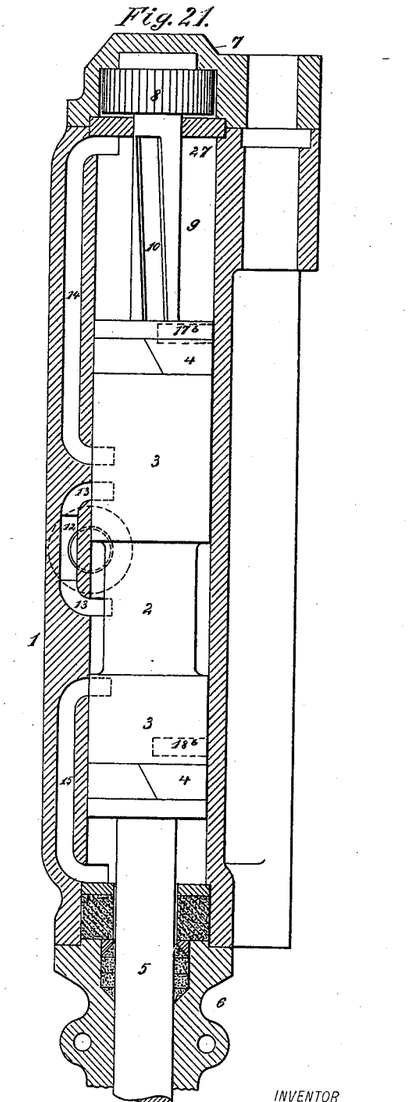
Figure 22:
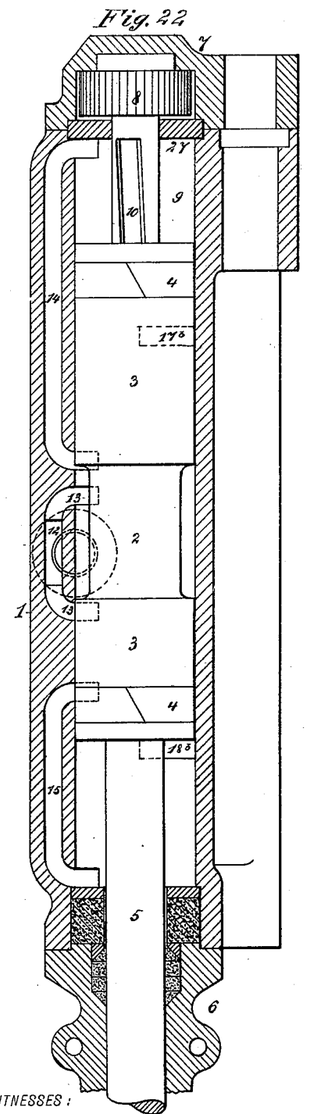
Figure 23:
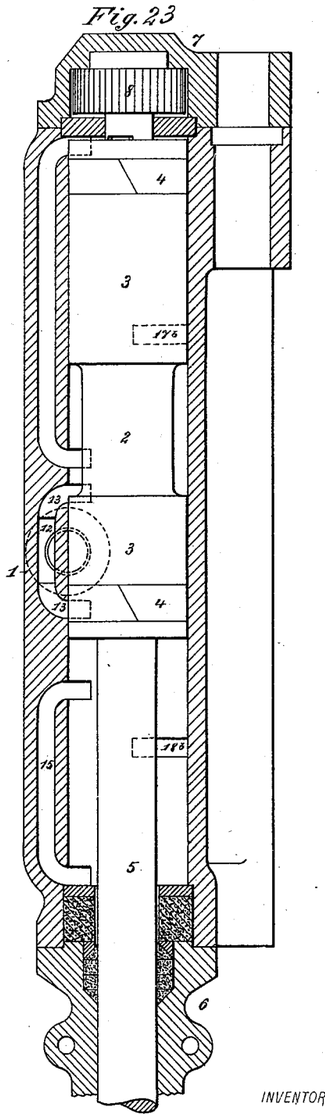
Figure 24:
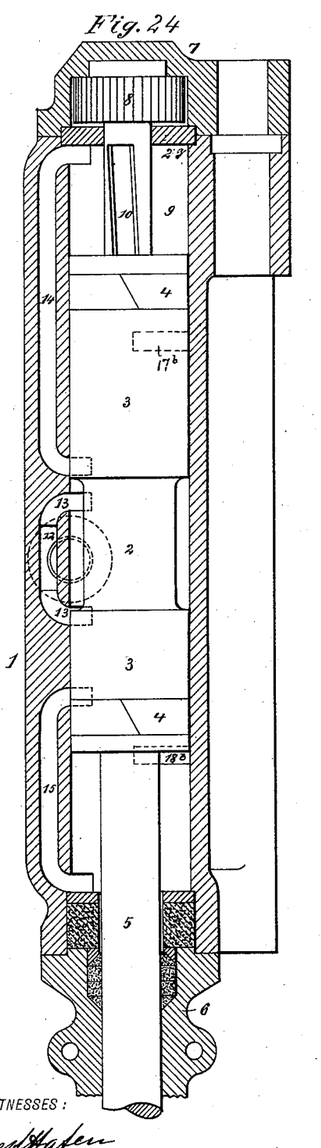
Figure 25:
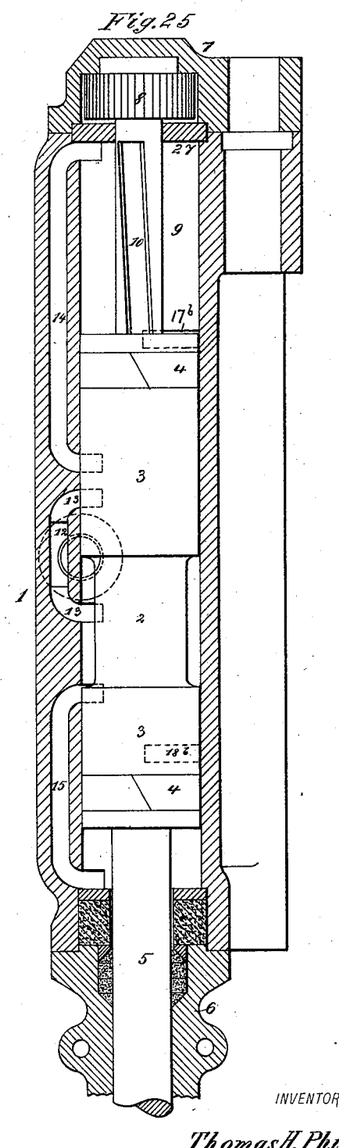
Figure 26:
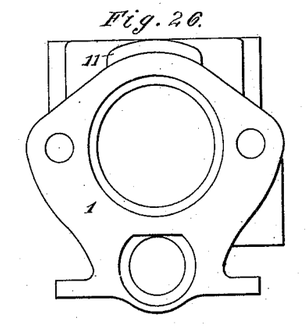
Fig. 26 is an end view of the cylinder of said tool, looking in the direction of the arrow, Fig. 20, and with the rear head removed.
Figure 27:
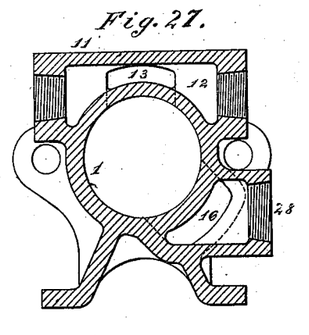
Fig. 27 is a transverse section of the cylinder on the line $n\,n$, Fig. 20, looking in the direction of the arrow.
Figure 28:
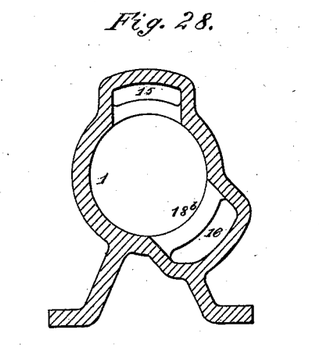
Fig. 28 is a transverse section on the line $s\,s$, Fig. 20, looking in the direction of the arrow.

Some of the advantages of my invention may be attained even without the use of a valve-controlled exhaust, such a tool being illustrated in Figs. 20 to 28. On reference to Figs. 20 to 25, however, which show successive positions of the piston in the cylinder, it will be observed that when said cylinder simply has the single exhaust-port 17$^b$ for one end of the cylinder, and a like single exhaust-port 18$^b$ for the other end, the preliminary cushioning which I have before alluded to is inevitable. Thus when the piston in its rearward movement closes the exhaust-port 17$^b$, as shown in Fig. 21, there is preliminary cushioning until the piston reaches the position shown in Fig. 22 and opens the inner end of the port 14, at which point the motive fluid is admitted to the rear end of the cylinder for cushioning purposes. On reference to Fig. 24, which shows the exhaust-port 18$^b$ almost closed by the piston on the forward stroke, it will be seen that there will be preliminary compression from the time the piston covers said exhaust-port 18$^b$ until it opens the inner end of the forward port 15 and permits motive fluid to enter the forward end of the cylinder for cushioning purposes, as shown in Fig. 25. Even with this construction, however, the advantages of the tool as regards the use of the motive fluid expansively, the interval of time between the cutting off of motive fluid from one end of the cylinder and its admission to the opposite end, and the differentiation in the force applied and cushioning effect exerted on the forward stroke as compared with like effects of the rearward stroke are attained, and the preliminary cushioning of the piston is, to some extent, compensated for by the entire absence of valves in the tool.

Figure 29:
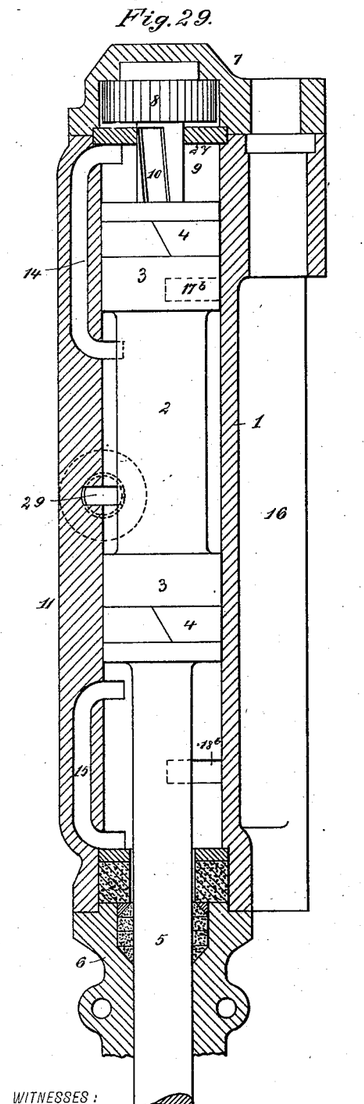
Fig. 29 is a longitudinal section of an impact-tool constructed in accordance with my invention, but illustrating a modified construction of piston and admission-port as compared with those shown in the other figures of the drawings.
Figure 30:
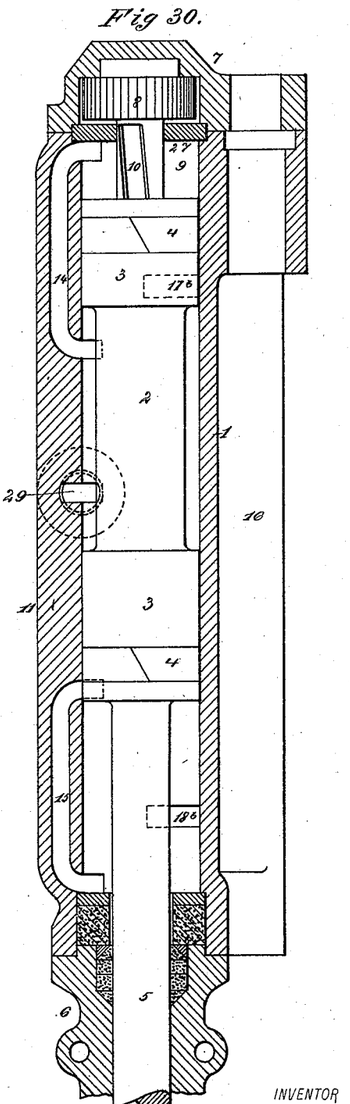
Fig. 30 is a longitudinal section of an impact-tool constructed in accordance with my invention, but illustrating a modified construction of piston, inlet-ports, and admission-port for the motive fluid as compared with those shown in the other figures of the drawings.

In all of the tools which I have thus far shown and described the inlet-governing ports 14 and 15 differ in length, as do also the front and rear heads of the piston, the forward inlet-port and forward head of the piston being shorter than the rear inlet-port and rear head of the piston, and although this construction is preferred the main object of my invention may be attained by a construction in which the ports 14 and 15 only are differentiated in length, the heads of the piston being of equal length, or, on the other hand, by a tool in which the heads of the piston only are differentiated in length, the length of the ports 14 and 15 being equal. These two constructions are shown respectively in Figs. 29 and 30, in which I have also shown a single inlet opening or port 29, instead of the two branch ports 13 of Fig. 1.

By the use of the valves for governing the exhaust of the motive fluid from the opposite ends of the cylinder independently of the piston I am enabled with a given length of stroke of the piston to use a considerably shorter cylinder than is possible when such exhaust-controlling valves are not employed. This feature of my invention may, as will be evident, be used in a tool having inlet-governing valve or valves—such, for instance, as shown in my former patent—and the valve structure may, if desired, be operated mechanically instead of directly by the motive fluid, as described, although the latter plan is preferred, as it is quick and certain and insures the locking of the valves between their movements.

Having thus described my invention, I claim and desire to secure by Letters Patent—

1. An impact-tool in which are combined a cylinder, a piston reciprocating therein, inlet-ports through which motive fluid is directed to the ends of the cylinder alternately, exhaust-ports independent of said inlet-ports, and a valve structure governing the flow through said exhaust-ports whereby escape of motive fluid through either of said valve-controlled exhaust-ports is prevented until the piston has reached a point in its stroke considerably in advance of said valve-controlled exhaust-port, substantially as specified.

2. An impact-tool in which are combined a cylinder having inlet-governing ports and exhaust-ports independent thereof, a piston serving by its movement in the cylinder to govern the flow of motive fluid to the ends of the same alternately, and a valve structure governing the discharge of motive fluid from the cylinder, the valve-controlled exhaust-ports being so located that the advancing piston will not cover such exhaust-port at either end of the cylinder until immediately before the admission of motive fluid into said end of the cylinder, substantially as specified.

3. An impact-tool in which are combined a cylinder having ports for governing the flow of motive fluid to the ends of the cylinder alternately, exhaust-ports independent of said inlet-ports, a reciprocating piston which, by its movement controls the flow of motive fluid to the ends of the cylinder, and a valve structure governing the discharge of motive fluid from the cylinder, the valve-controlled exhaust-ports being so located that the advancing piston will not cover such exhaust-port at either end of the cylinder until just before the admission of motive fluid to said end of the cylinder, and said cylinder having ports whereby the motive fluid admitted to either end of the cylinder can gain access to the exhaust-valve chamber and effect movement of the valve structure therein, whereby each valve-controlled exhaust-port will be cut off from the exhaust-discharge chamber upon the admission of motive fluid to that end of the cylinder with which said exhaust-port communicates, substantially as specified.

4. An impact-tool in which are combined a cylinder, a grooved piston reciprocating therein, ports for governing the flow of motive fluid to each end of the cylinder, an intermediate admission-port for supplying motive fluid to the groove of the piston, and exhaust-ports independent of the inlet-ports, the opposite heads of the piston serving in conjunction with the inner ends of the inlet-governing ports, to control the flow of motive fluid to the ends of the cylinder alternately, and the inner end of one inlet-governing port being closer to the intermediate admission-port than the inner end of the opposite inlet-governing port, substantially as specified.

5. An impact-tool in which are combined a cylinder, a grooved piston reciprocating therein, ports for governing the flow of motive fluid to each end of the cylinder, an intermediate admission-port for supplying motive fluid to the groove of the piston, and exhaust-ports independent of the inlet-ports, the heads of the piston operating in conjunction with the inner ends of the governing-ports to direct motive fluid to and cut it off from first one end of the cylinder and then the other end, and also operating in conjunction with the exhaust-ports to permit an escape of the motive fluid first from one end of the cylinder and then from the other end, and said piston-heads and the inlet and exhaust ports being so disposed in relation to each other that the motive fluid will be admitted to the rear end of the cylinder at an earlier period in the rear stroke than it is admitted to the forward end of the cylinder on the forward stroke, and will be exhausted from the rear end of the cylinder at a later point in the forward stroke than from the front end of the cylinder on the rearward stroke, substantially as specified.

In testimony whereof I have signed my name to this specification in the presence of two subscribing witnesses.

THOMAS H. PHILLIPS.

Witnesses:
FRANK E. BECHTOLD,
JOS. H. KLEIN.